United States Patent
Lawler et al.

(10) Patent No.: US 7,917,514 B2
(45) Date of Patent: Mar. 29, 2011

(54) VISUAL AND MULTI-DIMENSIONAL SEARCH

(75) Inventors: Stephen Lawler, Redmond, WA (US); Eric J. Horvitz, Kirkland, WA (US); Joshua T. Goodman, Redmond, WA (US); Anoop Gupta, Woodinville, WA (US); Christopher A. Meek, Kirkland, WA (US); Eric D. Brill, Redmond, WA (US); Gary W. Flake, Bellevue, WA (US); Ramez Naam, Seattle, WA (US); Surajit Chaudhuri, Redmond, WA (US); Oliver Hurst-Hiller, New York, NY (US)

(73) Assignee: Microsoft Corporation, Redmond, WA (US)

( * ) Notice: Subject to any disclaimer, the term of this patent is extended or adjusted under 35 U.S.C. 154(b) by 221 days.

(21) Appl. No.: 11/427,305

(22) Filed: Jun. 28, 2006

(65) Prior Publication Data
US 2008/0005105 A1    Jan. 3, 2008

(51) Int. Cl.
G06F 7/00 (2006.01)
G06F 17/30 (2006.01)
(52) U.S. Cl. ....................... 707/739; 707/711
(58) Field of Classification Search .............. 707/1–10, 707/711, 739
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 6,968,333 B2 | 11/2005 | Abott et al. | |
| 7,194,483 B1 * | 3/2007 | Mohan et al. | 707/104.1 |

(Continued)

FOREIGN PATENT DOCUMENTS
WO    9800787    1/1998

OTHER PUBLICATIONS

Andy Harter, et al., A Distributed Location System for the Active Office, IEEE Network, 1994, pp. 62-70.

(Continued)

*Primary Examiner* — Khanh B Pham
*Assistant Examiner* — Navneet K Ahluwalia
(74) *Attorney, Agent, or Firm* — Lee & Hayes, PLLC

(57) ABSTRACT

A system that can analyze a multi-dimensional input thereafter establishing a search query based upon extracted features from the input. In a particular example, an image can be used as an input to a search mechanism. Pattern recognition and image analysis can be applied to the image thereafter establishing a search query that corresponds to features extracted from the image input. The system can also facilitate indexing multi-dimensional searchable items thereby making them available to be retrieved as results to a search query. More particularly, the system can employ text analysis, pattern and/or speech recognition mechanisms to extract features from searchable items. These extracted features can be employed to index the searchable items.

20 Claims, 14 Drawing Sheets

U.S. PATENT DOCUMENTS

| | | | |
|---|---|---|---|
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2001/0046332 A1* | 11/2001 | Chang | 382/305 |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0095412 A1* | 7/2002 | Lee et al. | 707/7 |
| 2002/0099817 A1 | 7/2002 | Abbott et al. | |
| 2003/0046401 A1 | 3/2003 | Abbott et al. | |
| 2003/0123721 A1* | 7/2003 | Megiddo et al. | 382/159 |
| 2003/0154476 A1 | 8/2003 | Abbott, III et al. | |
| 2003/0177111 A1* | 9/2003 | Egendorf et al. | 707/3 |
| 2003/0195883 A1* | 10/2003 | Mojsilovic et al. | 707/6 |
| 2004/0024790 A1 | 2/2004 | Everett | |
| 2005/0021512 A1* | 1/2005 | Koenig | 707/3 |
| 2005/0034078 A1 | 2/2005 | Abbott et al. | |
| 2005/0084154 A1* | 4/2005 | Li et al. | 382/190 |
| 2005/0108001 A1* | 5/2005 | Aarskog | 704/10 |
| 2005/0289448 A1* | 12/2005 | Megiddo et al. | 715/501.1 |
| 2006/0012677 A1 | 1/2006 | Neven et al. | |
| 2006/0015492 A1* | 1/2006 | Keating et al. | 707/4 |
| 2006/0115108 A1* | 6/2006 | Rodriguez et al. | 382/100 |
| 2006/0116994 A1* | 6/2006 | Jonker et al. | 707/3 |
| 2006/0143176 A1* | 6/2006 | Mojsilovic et al. | 707/6 |
| 2006/0221357 A1* | 10/2006 | Uzawa | 358/1.1 |
| 2006/0227992 A1* | 10/2006 | Rathus et al. | 382/100 |
| 2007/0033170 A1* | 2/2007 | Sull et al. | 707/3 |
| 2008/0065964 A1* | 3/2008 | Zarrinkoub et al. | 714/776 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36-No. 7.

Roy Want, et al., The Active Badge Location System, ACM Transactions on Information Systems, Jan. 1992, pp. 91-102, vol. 10-No. 1.

Mark Weiser, Some Computer Science Issues in Ubiquitous Computing, Communications of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8-No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr., Minimizing information overload: the ranking of electronic messages, Journal of Information Science 15, Elsevier Science Publishers B.V., 1989, pp. 179-189.

Funkhouser, et al., "A Search Engine for 3D Models", ACM Transactions on Graphics, Jan. 2003.

Image Understanding, Stuart Shapiro, http://www.aaai.org/AITopics/pmwiki/pmwiki.php/AITopics/ImageUnderstanding, 1996, pp. 1-13.

International Search Report dated Nov. 30, 2007 for PCT Application Serial No. PCT/US2007/014990, 7 pages.

Spoken dialogue technology: enabling the conversational user interface, Michael McTear, ACM, Mar. 2002, pp. 1-80.

Wactar, et al., Complimentary Video and Audio Analysis for Broadcast News Archives, Communications of the ACM vol. 43, No. 2, Feb. 2000.

Yeh, et al., "Searching the Web with Mobile Images for Location Recognition". Proceedings of the 2004 IEEE Computer Society Conference on Computer Vision and Pattern Recognition (CVRP'04).

Yeh, et al., "A Picture is Worth a Thousand Keywords: Image-Based Object Search on a Mobile Platform", In CHI 2005, Conference on Human Factors in Computing Systems, Portland, OR, Apr. 2005.

* cited by examiner

VISUAL AND MULTI-DIMENSIONAL SEARCH

CROSS-REFERENCE TO RELATED APPLICATIONS

This application is related to pending U.S. patent application Ser. No. 11/427,303 filed on Jun. 28, 2006, entitled "VISUAL AND MULTI-DIMENSIONAL SEARCH". The entirety of the above-noted application is incorporated by reference herein.

BACKGROUND

Conventional computer-based search, in general, is extremely text-centric in that search engines typically analyze alphanumeric search queries in order to return results. To the extent visualization is incorporated into a search, it is often performed through use of metadata, for example, where items are manually pre-tagged with metadata corresponding to physical attributes of the visual item. In other words, traditional search engines employ pre-indexed metadata in order to return image data in response to a search query.

Search engines agents, often referred to as spiders or crawlers, navigate websites in a methodical manner and retrieve information about sites visited. For example, a crawler can make a copy of all or a portion of websites and related information. The search engine then analyzes the content captured by one or more crawlers to determine how a page will be indexed. Some engines will index all words on a website while others may only index terms associated with particular tags such as such for example: title, header or metatag(s). Crawlers must also periodically revisit webpages to detect and capture changes thereto since the last indexing.

Once indexes are generated, they typically are assigned a ranking with respect to certain keywords, and stored in a database. A proprietary algorithm is often employed to evaluate the index for relevancy, for example, based on frequency and location of words on a webpage, among other things. A distinctive factor in performance amongst conventional search engines is the ranking algorithm respectively employed.

Upon entry of one or more keywords as a search query, the search engine retrieves indexed information that matches the query from the database, generates a snippet of text associated with each of the matching sites and displays the results to a user. The user can thereafter scroll through a plurality of returned sites in connection with determining if the sites are related to interests of the user. However, this can be an extremely time-consuming and frustrating process as search engines often return a substantial number of sites. More often then not, the user is forced to further narrow the search iteratively by altering and/or adding keywords and Boolean operators to converge on websites that provide the sought after information. Improved search paradigms are needed to address the ever-increasing demand for fast, efficient and seamless searches.

SUMMARY

The innovation disclosed and claimed herein, in one aspect thereof, comprises a system that can analyze a multi-dimensional input, and establish a search query based upon features extracted from the multi-dimensional input. For example, image data can be used as an input to a search mechanism. Accordingly, pattern recognition and image analysis can be employed to establish a search query that corresponds to features extracted from the image input.

In another aspect, the system can facilitate indexing multi-dimensional searchable items thereby making them available to be retrieved as results to a search query. More particularly, the system can employ text analysis, pattern and/or speech recognition mechanisms to extract features from searchable items. These extracted features can be employed to index the searchable items.

The subject innovation provides for a dynamic visual-search based system that performs search in a manner similar to how humans conduct mental searches in connection with visual-based cues. For example, in accordance with an embodiment, if the term "blue" is used in a search query, the system can search for items that possess the physical characteristics of "blue", regardless of whether the item is pre-tagged with "blue" metadata.

In still other aspects, search in accordance with the innovation can be performed on different dimensions. Part of a search query could include a picture of an individual within a particular context (e.g., time, place, state). Thus, for example, rather than manually typing in a text query, an image can be used as an input. An image extraction component can extract relevant information from the inputted image (e.g., subject characteristics, time, place, state), formulate a search query (e.g., text and/or image-based) and employ a pattern recognition component to facilitate locating all results (e.g., websites) that relate to the subject/context of the image input.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and features of the innovation will become apparent from the following detailed description of the innovation when considered in conjunction with the drawings.

DETAILED DESCRIPTION

Figure 1:
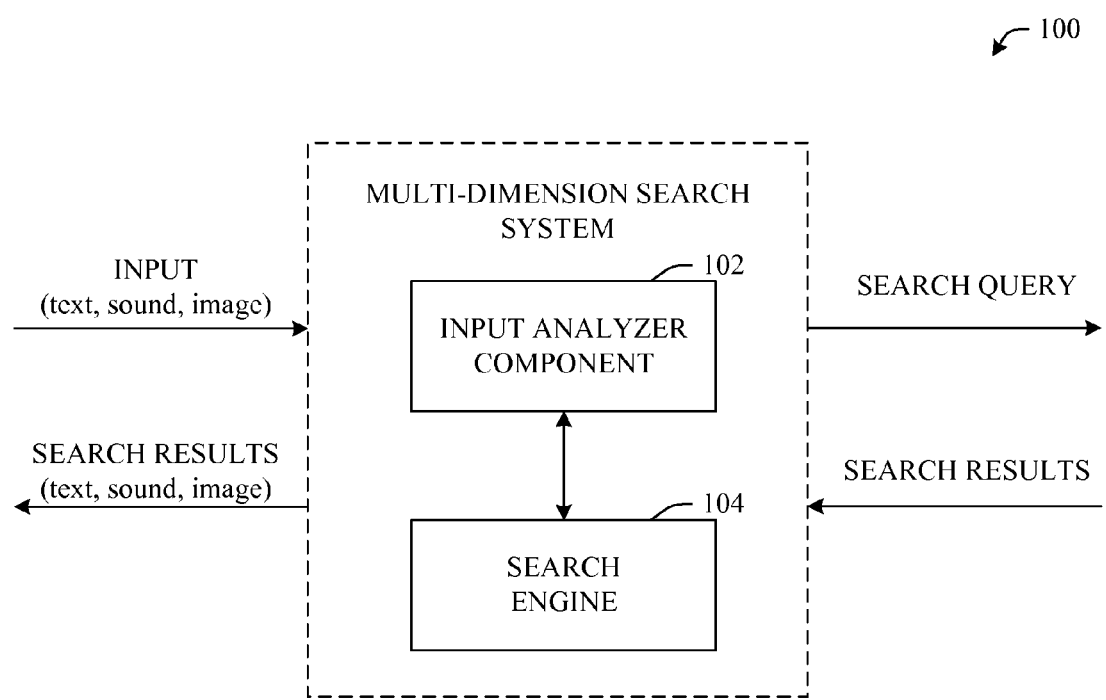
FIG. 1 illustrates a block diagram of a search system that facilitates establishing a search query from a multi-dimensional input in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates a multi-dimension search system 100 having a least two overall aspects. First, the system 100 can extract features and data from an input having multiple dimensions (e.g., text, audio, video, multi-media). Once extracted, the features can be employed to generate (or modify) a search query. In turn, the search query can be utilized to return search results related to the input. Another aspect of system 100 is the ability to locate search results based upon features of the searchable data item. In other words, the system 100 can facilitate analyzing searchable data items (e.g., web pages, image files, audio files, multi-media files) in order to extract features. Once the features are extracted from a data item, the system 100 can facilitate returning and/or indexing the item thus making it available for search. Each of these scenarios will be described in greater detail infra.

Generally, the multi-dimension search system 100 can include an input analyzer component 102 and a search engine component 104. As shown, an input (e.g., text, sound, image) can be conveyed to the input analyzer component 102 where features (e.g., attributes, characteristics) can be extracted from the input. As will be described below, in one aspect, pattern recognition can be employed to determine attributes and/or characteristics from an image input. In a more particular example, supposing that the input is an image of an individual standing in front of a landmark, the input analyzer can use a specialized form of pattern recognition (e.g., facial recognition), in order to determine identity of the user. Similarly, pattern recognition could be used to determine location of the individual by analyzing the landmark.

Once these and other features and attributes are determined, a search query can be established and transferred to the search engine 104. The search engine 104 can be employed to retrieve search results in accordance with the query. In other examples, the search engine 104 can retrieve results from the Internet, intranet, local or remote servers/stores, etc. Effectively, embodiments of the innovation facilitate establishing a search query from a variety of non-conventional inputs.

Although traditional systems can render results in a variety of data types (e.g., text, webpage links, image files), these conventional systems remain text-centric as they rely on manually generated metadata and tags in order to map the search query to potential results. To the extent visualization is incorporated, such visualization is typically performed through use of user-defined metadata—searchable items are manually pre-tagged with metadata corresponding to attributes of the item.

In contrast to conventional search mechanisms, one feature of the subject system 100 is to extract features and attributes from the input. For example, the system can receive an image file as an input and extract features including, but not limited to, colors, patterns, locations, etc. In this aspect, pattern recognition systems can be employed to analyze the image thereafter establishing a search query that can be used to retrieve relevant search results.

Properties considered in the search can include the size and structure of a document, including such aspects of the length of a document, whether or not a document ends with a set of references as might be included in an academic document, and the number, distribution, and overall nature of the figures contained within a document (e.g., line drawings, cartoons, images, tables of numbers, charts, specification of parameters of the histogram of one or more images contained within a document, etc.).

In aspects, details about figures contained in documents can be recognized and indexed, such as the recognition and encoding of information about whether maps or other graphical or image-based indications of geocentric content appears within document(s). Other examples include recognition about the presence of charts within documents, and the recognition of such properties as the containment of Cartesian graphs or three-dimensional plots with particular properties (e.g., represented in text or other tokens) on axes of the graphs.

Properties of use in indexing and retrieval can even include automatically recognized structure in such graph-centric visualizations, such as whether contained graphical data displays trends showing "increases in quantities over time," such as "financial graphs" showing increases in economic value of one or more measures over time.

The use of such recognized properties of figures and such classes of visual components such as graphs of variables are examples of one of many other potential classes of visual object.

The relationship of graphical content to textual content and to other properties such as pointers or URLs (Uniform Resource Locator) among pages or among textual or graphical content can be considered in indexing and retrieval, in a manner analogous to the way that pointers have been used in indexing and retrieving textual content.

Beyond text-centric queries, graphical content, in the form of low- or high-level specifications of graphical properties, can be used, with or without textual information, to formulate queries. For instance, examples of graphical content such as sample figures or other graphical components can be used in formulating queries.

Beyond their use in indexing and retrieval, properties of graphical content, in addition to textual content, can be used in the structuring of the display of items in response to input queries.

The following scenario is provided to add perspective to the innovation and is not intended to limit the innovation in any way. To this end, it will be appreciated that other scenarios can exist that employ the features of the innovation. These additional scenarios are to be included within the scope of the innovation and claims appended hereto.

As was described above, search in accordance with the innovation can be performed on different dimensions. For instance, part of a search query could include a picture of an individual within a particular context. Thus, for example, rather than inputting a text search query as "Bill Clinton wearing a blue suit, sitting next to Price Charles at dinner" an image of such an event could be used as an input to the system 100. In accordance with the system 100 of FIG. 1, the input analyzer component 102 can extract relevant information (e.g., identity of Bill Clinton and Prince Charles, blue suit, as well as the context of dinner) from the inputted image, formulate a query (text and/or image-based) and facilitate locating all websites relating to the above-noted event.

Figure 2:
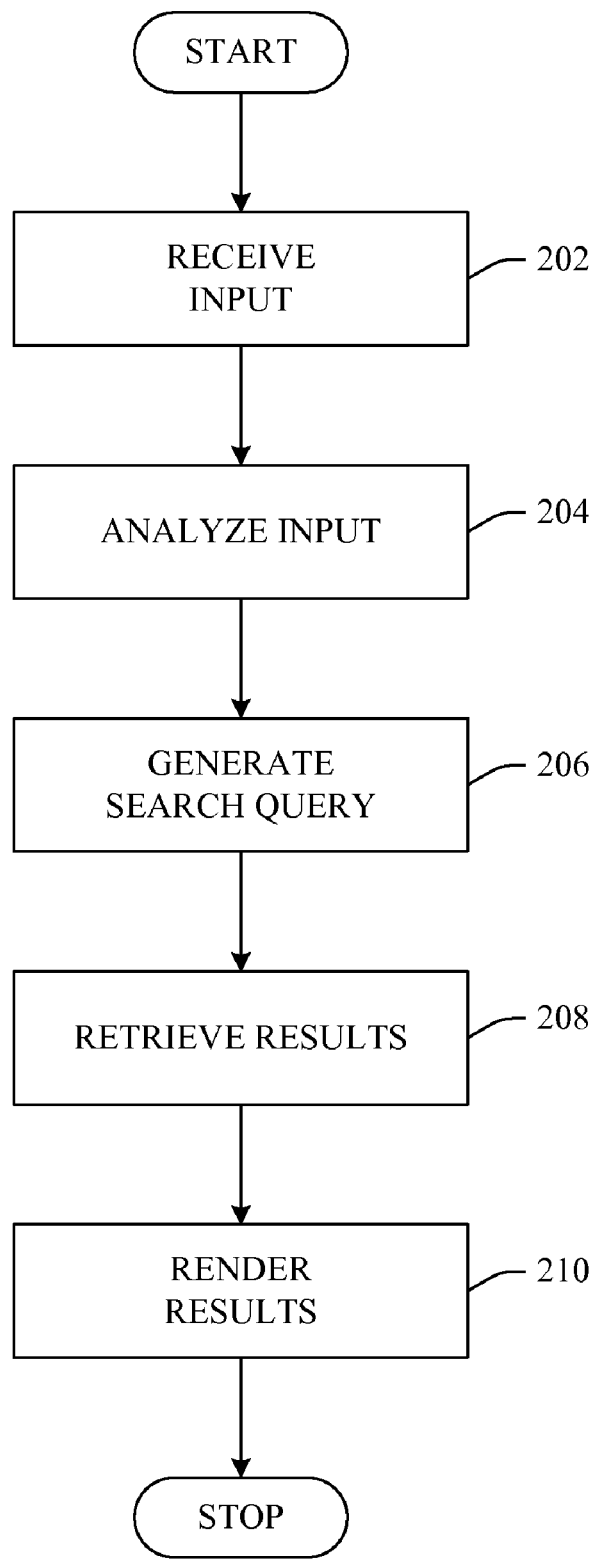
FIG. 2 illustrates an exemplary flow chart of procedures that facilitate generating a search query from a multi-dimensional input in accordance with an aspect of the innovation.

FIG. 2 illustrates a methodology of generating a search query from an input in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, an input can be received which represents a specific type of data. For example, the input can include data of the form including, but not limited to, text, image, audio, etc. As well, the input can take the form of multi-dimensional data whereby the input includes more than one type of data. For instance, video streams can include image and audio data. The input can be analyzed at 204 in order to identify features, attributes and/or characteristics associated with the input. For example, as described above, pattern recognition mechanisms can be applied to an image document to identify the subject(s) and context of a particular image. In a particular example, an aerial image of a sports game can be analyzed to determine criteria such as, which teams are playing, the name of the stadium, time of the game (day or evening), etc. These features can be used to generate a search query.

Referring to a specific example, pattern recognition can be employed to determine that the image depicts a "baseball game" between the "Pittsburgh Pirates" and the "Baltimore Orioles" played at "Three Rivers Stadium." Accordingly, a search query can be formulated at 206 using the extracted features "Baseball Game between Pittsburgh Pirates and Baltimore Orioles at Three Rivers Stadium."

In accordance with the search query established from the image input, results can be retrieved at 208. Continuing with this example, results can be retrieve that pertain to the 1971 and 1979 World Series. More particularly, web page links, images, video as well as audio files can be returned related to the Pirates and Baltimore Orioles in the 1971 and 1979 World Series at Three Rivers Stadium. These results can be rendered (e.g., displayed) at 210.

Figure 3:
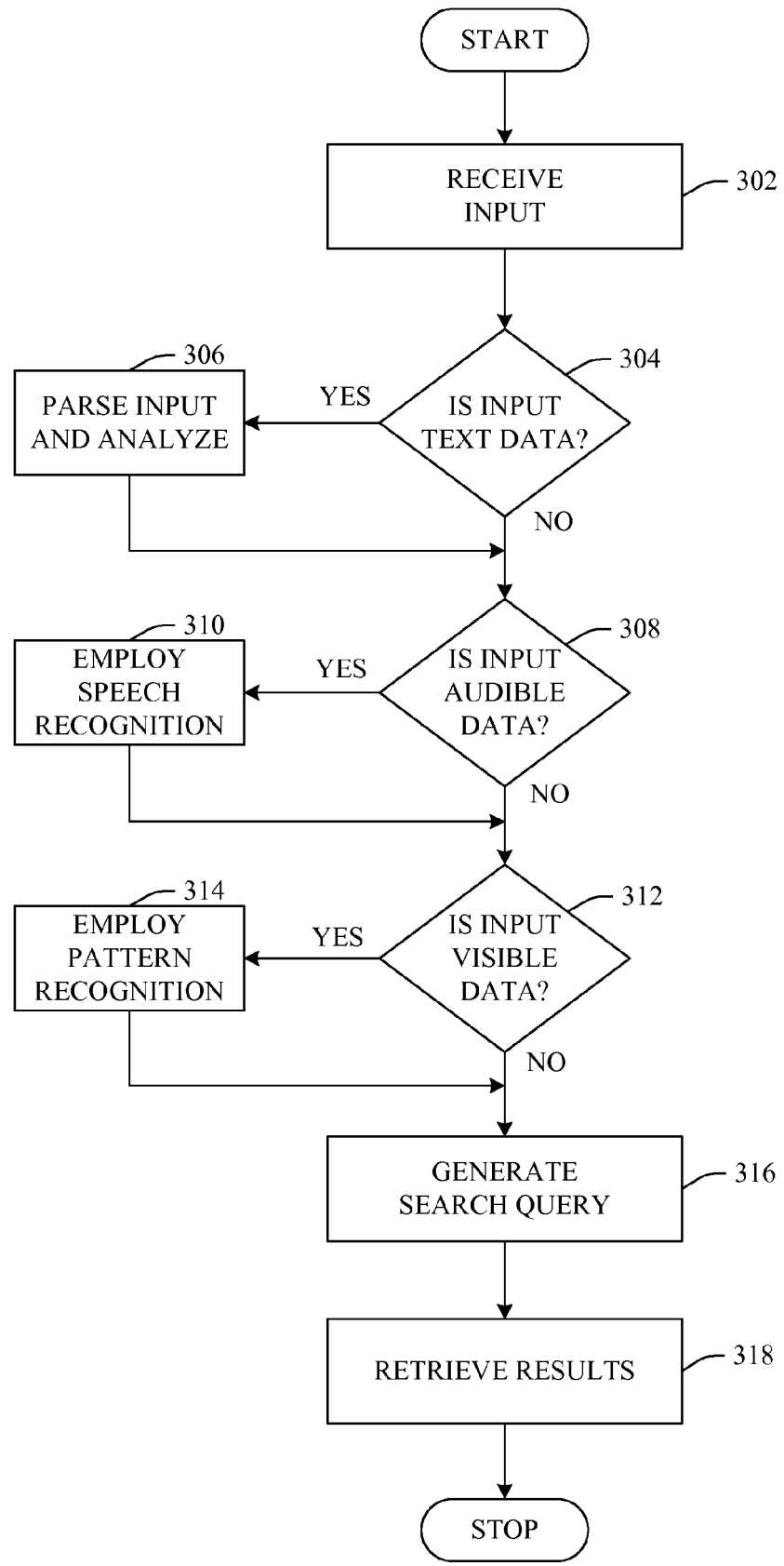
FIG. 3 illustrates an exemplary flow chart of procedures that facilitate analyzing an input having text, audible and visible characteristics in accordance with an aspect of the innovation.

FIG. 3 illustrates a methodology of analyzing an input in accordance with an aspect of the innovation. At 302, an input can be received which, as described above, can be of essentially any media type. For example, the input can be text, image, streaming audio, streaming video or combination thereof. As will be understood upon a review of the methodology that follows, the innovation can be employed to analyze most any multi-dimensional (as well as single dimensional) input.

At 304, a determination is made to conclude if the input includes text data. If so, at 306, the input can be parsed and analyzed to determine keywords. Similarly, at 308, a determination can be made to conclude if the input includes audible data. If the input does include audible data, at 310, speech recognition mechanisms can be used to establish key words associated with the audible data. By way of example, if the audible data is a song, the speech recognition can be used to translate audible speech into text lyrics with respect to the song.

Still further, at 312, a determination is made if the input contains visible data (e.g., image data). As with text and sound described above, if visible data is present, key features (e.g., attributes and/or characteristics) can be established via pattern recognition mechanisms at 314. In one particular aspect, facial recognition mechanisms can be employed to determine an identity of an individual in the image. Further, pattern recognition can be employed to determine other characteristics included within the image such as, for example, places, buildings, landmarks, colors, venues, etc.

Once the input is analyzed (e.g., 304-314), at 316, a search query can be established utilizing the gathered information. Subsequently, results with respect to the search query can be retrieved at 318. As will be described in greater detail with reference to the figures that follow, the results can be configured (e.g., filtered, ranked, ordered) as desired upon rendering (e.g., displaying) to a user.

Figure 4:
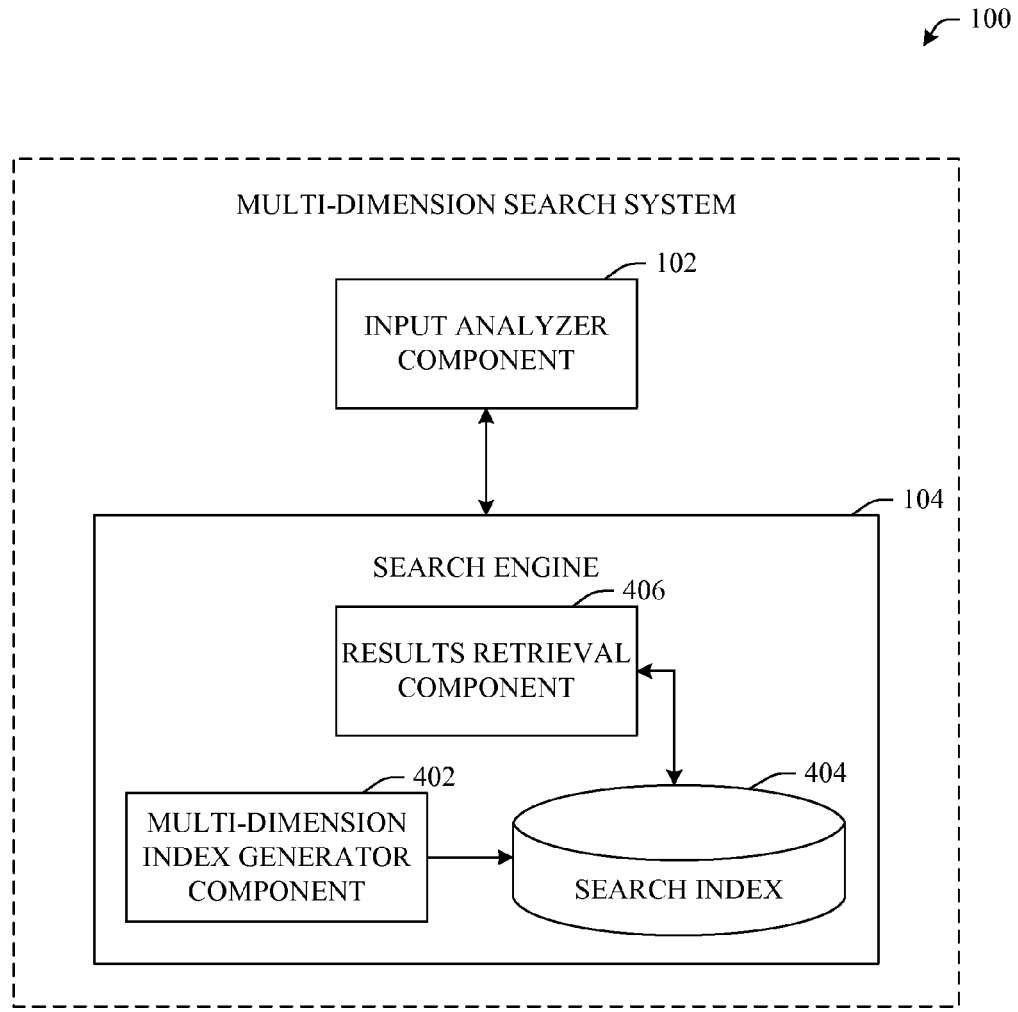
FIG. 4 illustrates a block diagram of a system that facilitates indexing multi-dimensional searchable items in accordance with an aspect of the innovation.

Referring now to FIG. 4, an alternative block diagram of multi-dimension search system 100 is shown. More specifically, the alternative aspect of system 100 illustrates that search engine 104 can include a results retrieval component 402, a multi-dimension index generator component 404, and a search index 406. In operation, these three sub-components (402, 404, 406) can facilitate dynamically indexing and/or retrieving multi-dimensional items with respect to a search query.

As described above, in one aspect, the system 100 can provide for a dynamic visual search that performs search more in a manner to the way humans conduct mental searches in connection with visual-based cues. For example, in accordance with an embodiment of the innovation, if the term "blue" is used in an input or if the color "blue" appears in an input image, the system can recognize this feature and search for items that possess the physical characteristics of "blue", regardless of whether the item is manually pre-tagged with "blue" metadata. In doing so, the search engine 104 can employ the results retrieval component 402 to dynamically locate results with this attribute. More specifically, the search engine 104 can employ pattern recognition systems (via the results retrieval component 402) for example, to extract visual information from searchable items. In another aspect, this extraction of visual information can be performed as part of an indexing system as shown in FIG. 4. In accordance with the aspect illustrated in FIG. 4, the multi-dimension index generator component 404 can build an index 406 based upon features associated with the data item (e.g., webpage, file, image data, streaming audio or video data).

Figure 5:
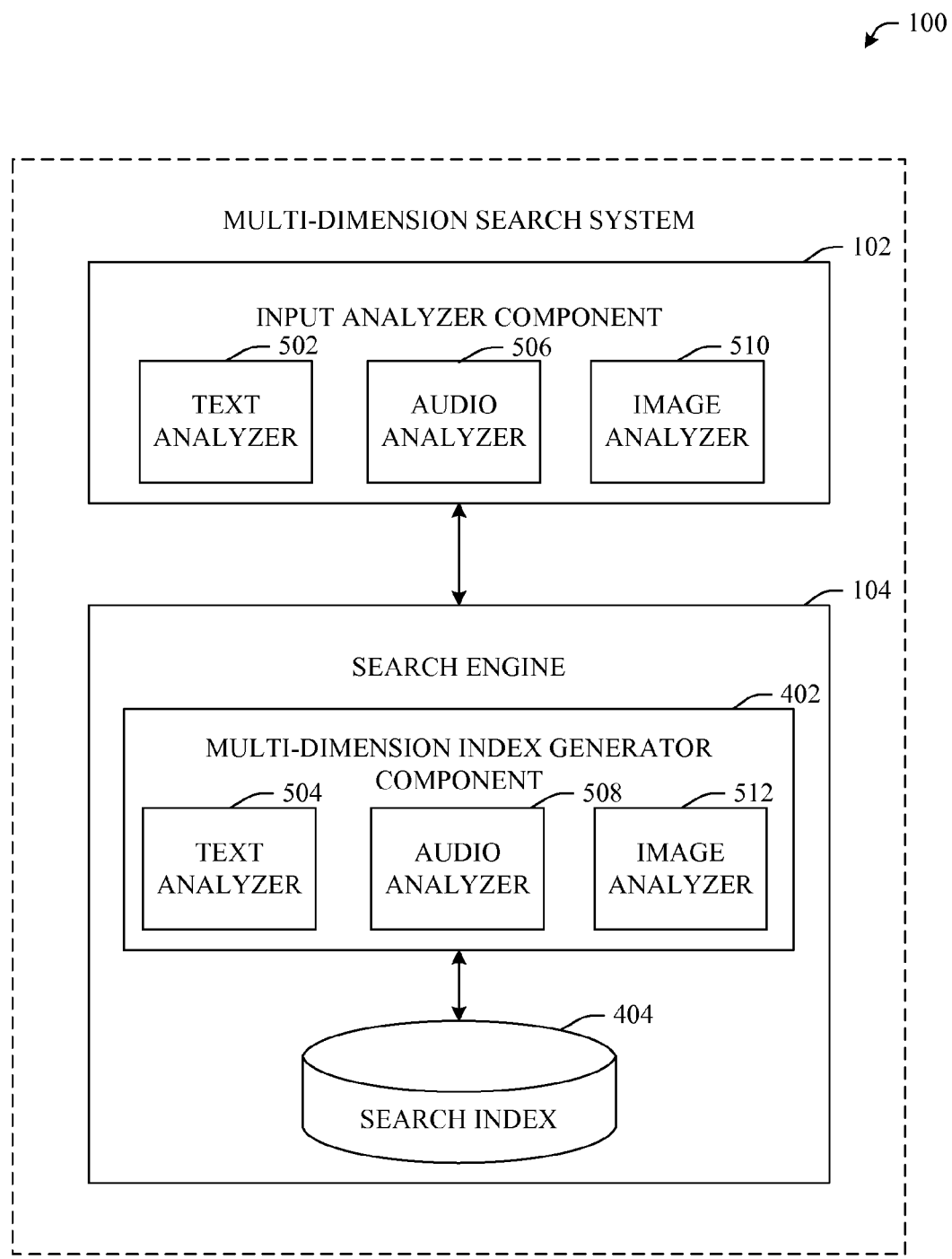
FIG. 5 illustrates an architectural block diagram that employs text, audio and image analysis in establishing a search query and/or indexing searchable items in accordance with an aspect of the innovation.

Turning now to FIG. 5, an alternative block diagram of system 100 is shown. In particular, the system 100 of FIG. 5 illustrates that the input analyzer component 102 and the multi-dimension index generator component 402 can each include a text analyzer (502, 504), an audio analyzer (506, 508) and an image analyzer (510, 512). Although each component (102, 402) is illustrated to include content analyzer components (502-512) it is to be understood that a single set of content analyzer components can be provided and employed by input analyzer component 102 as well as the multi-dimension index generator 402 in order to discover features included within an input and searchable-items respectively.

As described supra, each of the sub-components (502-512) enable the system to extract features from an input as well as a searchable item. In one aspect, this feature extraction allows a user input to be analyzed thereafter establishing a search query from the extracted features. In another aspect, this feature extraction facilitates automatic and dynamic index of searchable items. In other words, in accordance with this indexing mechanism, the system can automatically and/or dynamically extract features from searchable items thereafter making them available for search based upon a particular query or set of queries.

Figure 6:
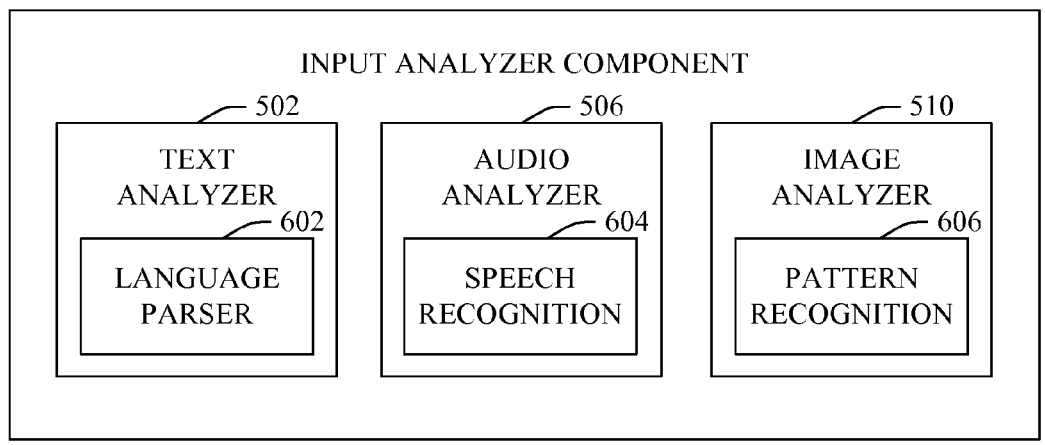
FIG. 6 illustrates a block diagram of an input analyzer component that employs a language parser, a speech recognition, and a pattern recognition mechanism to establish a search query in accordance with an aspect of the innovation.

Referring to the input analyzer component 102, FIG. 6 illustrates exemplary sub-components of input analyzer component 102 by which the particular analysis can be effectuated. More specifically, in one aspect, the text analyzer 502 can include a language parser 602 which can parse an input to establish an appropriate search query. As will be appreciated, parsing the input can break down the words of the input into functional units that can be converted into search query keywords. In another example, parsing mechanisms can interpret an input, such as "Where did Bill Clinton last meet with Prince Charles?" into the keywords, "Place, Bill Clinton, Meet, Prince Charles." These keywords can be employed as a search query to return associated results.

In other aspects, the audio analyzer 504 can include a speech recognition component 604 and the image analyzer component 506 can include a pattern recognition component 606. For instance, suppose the input is an image. As such, image processing mechanisms can be employed to analyze the image using techniques that can identify shades, colors and relationships, figures, shapes, etc. The image processing functionality of the pattern recognition component 606 can process images in bitmapped graphics format that have been scanned in or captured, for example via digital cameras.

Pattern recognition 606 can refer to a field within the realm of machine learning and reasoning (MLR) where the system can classify patterns of data based upon a priori knowledge and/or upon statistical information that is extracted from the identified patterns within an image. Most often, the classified patterns are groups of measurements or observations which define points in an appropriate multi-dimensional space. A pattern recognition system 606 can include a sensor or group of sensors that gather the observations to be classified or described supra. A feature extraction mechanism can be employed to compute information (e.g., numeric or symbolic) from the observations. As well, the pattern recognition system can include a classification or description mechanism that actually classifies or describes the observations based upon the extracted features. Image analysis is a form of pattern recognition that is directed to digital images as input to pattern recognition systems.

Essentially, image analysis refers to the extraction of meaningful information from images. It will be understood that image analysis techniques can range from simple tasks such as barcode readers to more sophisticated and advanced analysis such as facial recognition systems which can identify an individual based upon an analysis of facial features.

Figure 7:
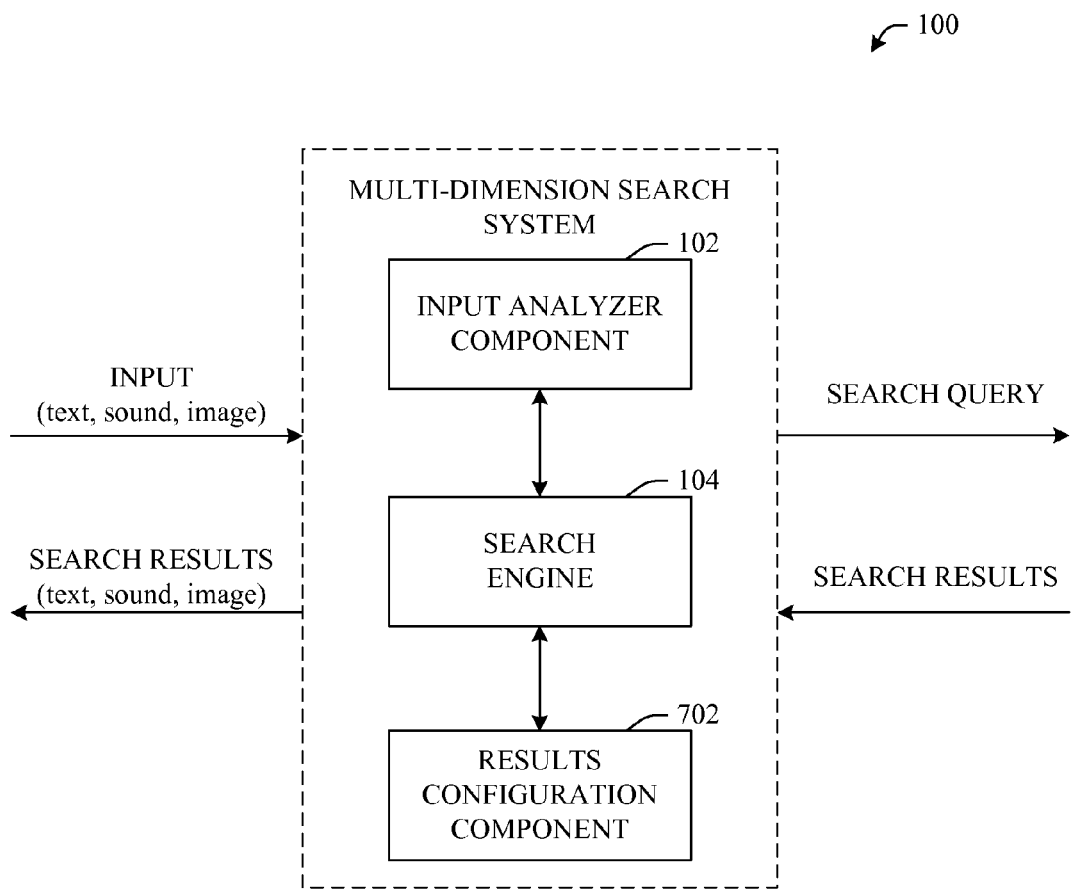
FIG. 7 illustrates a block diagram of a system that employs a results configuration component to filter and/or organize search results in accordance with an aspect of the innovation.

Turning now to FIG. 7, an alternative aspect of system 100 is shown where the multi-dimension search system includes a results configuration component 702. In operation, the results configuration component 702 can facilitate filtering, sorting, indexing, ranking, and thereafter displaying the results in a desired manner. In one specific example, it is a feature of the innovation to enable search results to take on a more of a visual-centric form. For example, rather than providing a text-based uniform resource locator (URL) or string as the search result, the results can be presented in the form of an image (or group of images) thus facilitating high glanceability. Additionally, the results can include combination of text, visual and audible data thereby enhancing rendering mechanisms of the innovation.

Furthermore, as illustrated in FIG. 7, a search input can be conducted upon multiple dimensions where extrinsic dimensional data (e.g., temporal, audio, visual, context, mood, events, etc.) can be mapped to a search query and results to provide for indexing and viewing of large amounts of data across multiple dimensions.

Figure 8:
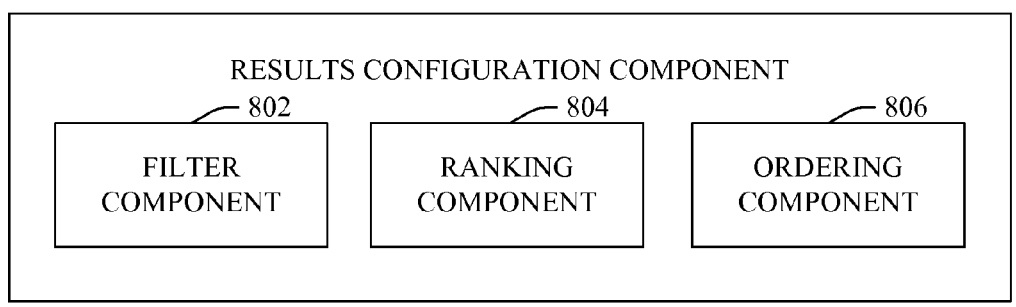
FIG. 8 illustrates an exemplary results configuration component in accordance with an aspect of the innovation.

FIG. 8 illustrates an exemplary results configuration component 702 in accordance with an aspect of the innovation. As shown, the results configuration component 702 can include a filter component 802, a ranking component 804 and an ordering component 806. Each of these components can be employed to affect the rendering of the search results in accordance with a desired preference and/or multi-dimensional context.

For example, the filter component 802 can be employed to automatically filter a subset of search results based at least in part upon a time of day, location, device context, etc. In each scenario, the filter component 802 can infer an appropriate sorting and/or filtering criteria based upon extrinsic multi-dimensional factors. Similarly, the ranking component 804 and the ordering component 806 can be employed to organize results based upon a determined and/or inferred context or external multi-dimensional data.

The following scenario is provided to add perspective the innovation and is not intended to limit the innovation in any way. In other words, the following scenario is provided to illustrate some of the features of the innovation without intending to limit the scope of this disclosure and/or claims appended hereto.

Figure 9:
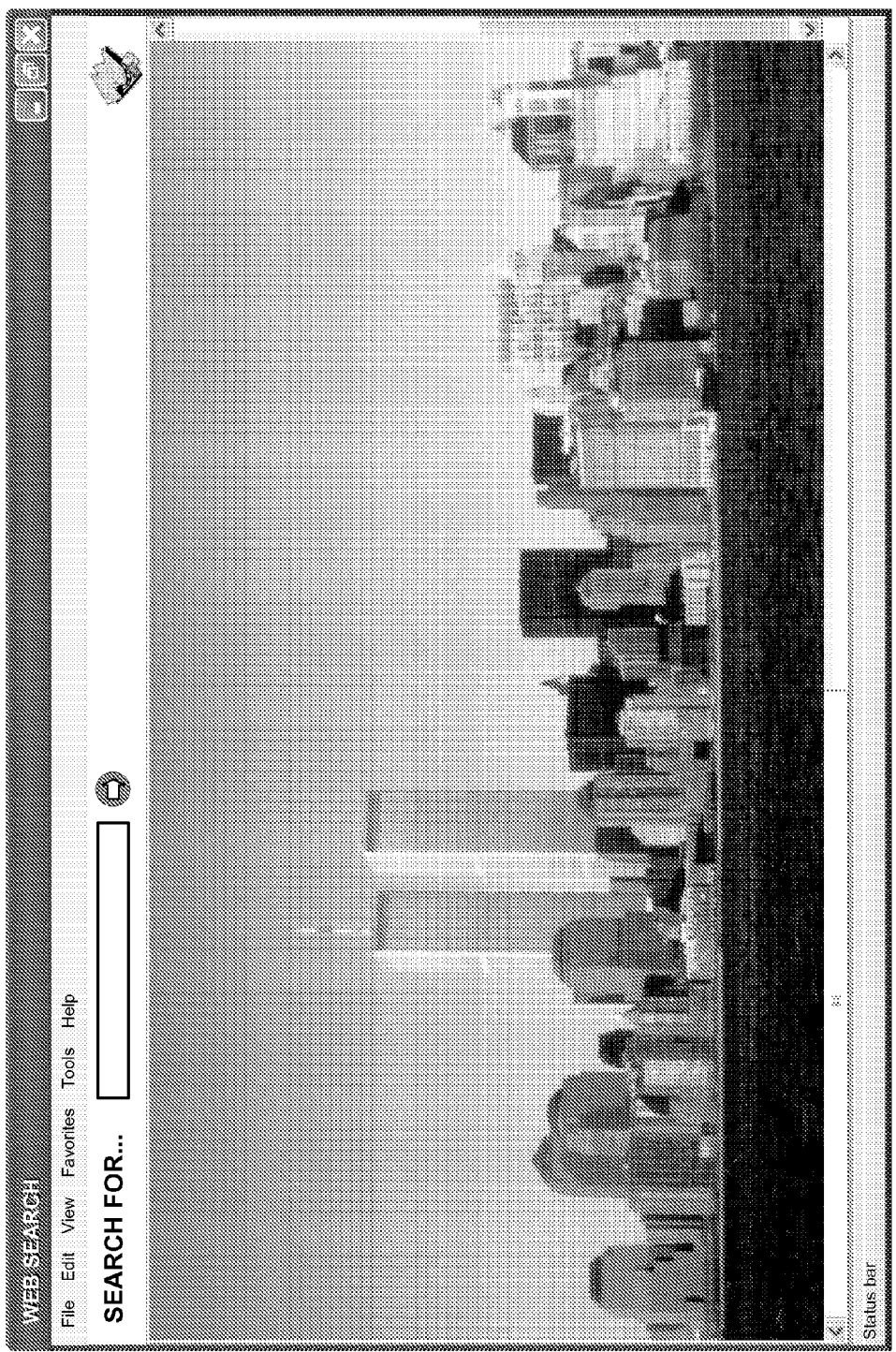
FIG. 9 illustrates an exemplary screen shot of an image input in accordance with an aspect of the innovation.

Referring now to FIG. 9, a screen shot of a search input in accordance with an aspect of the innovation is shown. More particularly, as shown, the input to a search operation can be an image of a city skyline. As described above, the features of the innovation can perform image analysis upon the image to determine and extract features of the image. Once extracted, the system can establish a search query based upon the extracted features.

Figure 10:
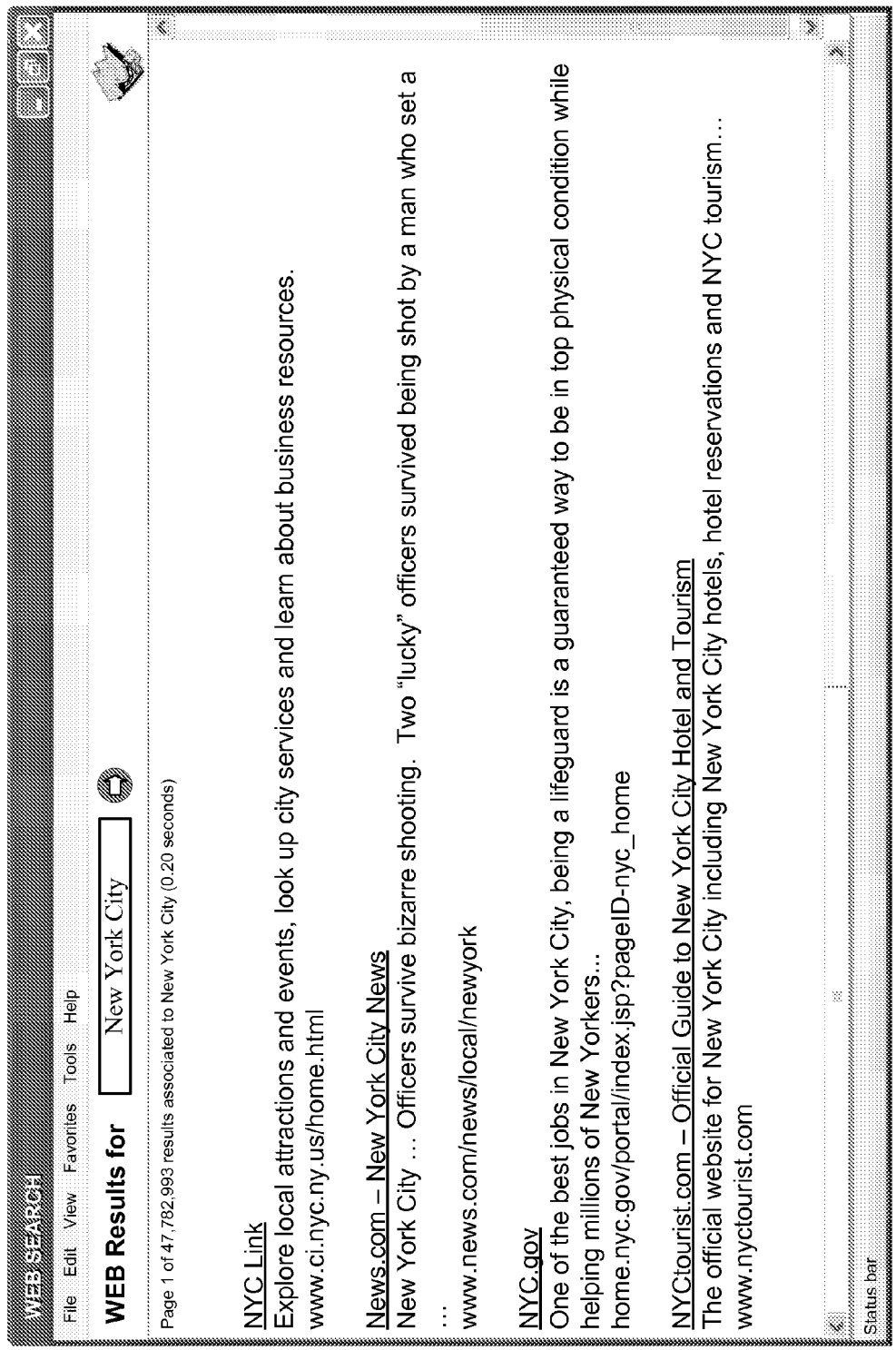
FIG. 10 illustrates an exemplary set of results in accordance with the input of FIG. 9.

FIG. 10 illustrates an exemplary set of search results. As shown, the results can be rendered in order accordance with relevance to the established search query. In this example, the system can establish, via image analysis, that the image is of New York City. To this end, a search can be conducted and results rendered as shown in FIG. 10. Although the results of FIG. 10 are illustrated in text form, it is to be understood and appreciated that other means of rendering results (e.g., visual, audible) can be employed without departing from the spirit and/or scope of the innovation. For example, in another aspect, an image could be rendered in addition to or in place of the text result(s) thereby enhancing review time (e.g., glanceability).

Figure 11:
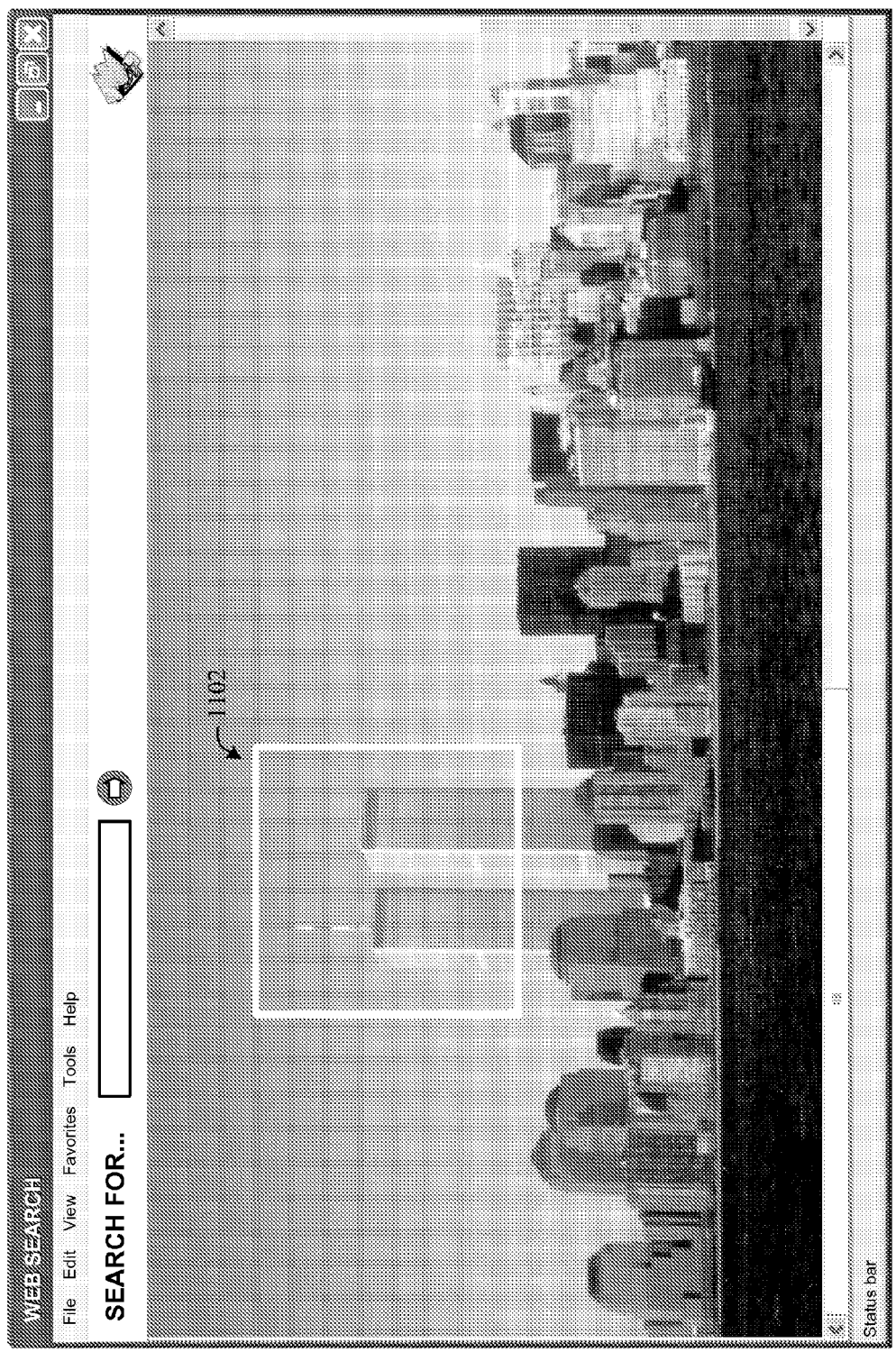
FIG. 11 illustrates an exemplary selection area overlaid upon an input image in accordance with an aspect of the innovation.
Figure 12:
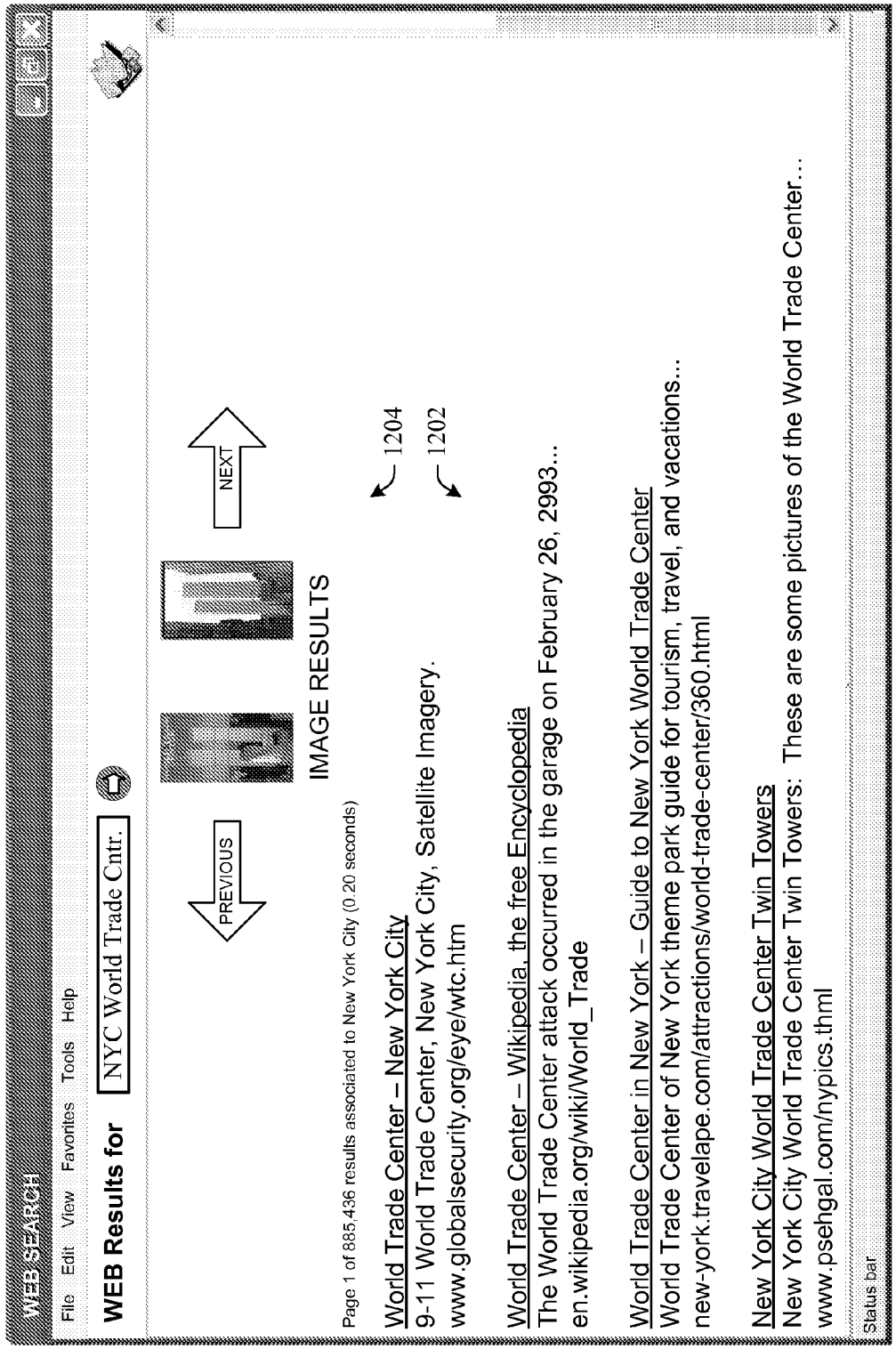
FIG. 12 illustrates an exemplary set of text and image results in accordance with the selected region of FIG. 1.

FIG. 11 illustrates that a selection mechanism 1102 can be employed to identify a portion(s) of an image to be used as an input. In this example, the selection mechanism 1102 is a square that defines the area around the World Trade Center. As such, FIG. 12 illustrates an exemplary set of search results 1202, 1204 that can be rendered based upon a search query automatically formulated from the selection.

As shown, the results can include text results 1202 ordered, ranked and/or filtered in considerably any manner. For example, the results can be configured based upon a user context (e.g., temporal, location, device type, user state, mood . . . ) As well, in order to enhance glanceability, an image can be added or inserted in place of the text results shown. Similarly, annotation (e.g., highlighting, underlining, font formatting) techniques can be added to the results in order to enhance effects of rendering the results. These annotation techniques are to be included within the scope of the innovation and claims appended hereto.

Additionally, in accordance with the functionality of the innovation, the system can return images 1204 that corresponded to the search query. As described above, these images can be provided by extracting features from potential search results as described above. In disparate aspects, searchable items can be indexed in accordance with extracted features. As such, the system can search the index thereafter rendering results. Similarly, the system can extract features on-the-fly thereby rendering image-based results in accordance with the search query in lieu of pre-indexing.

In accordance with aspects of the innovation, the system 100 can employ an MLR component (not shown) which facilitates automating one or more features in accordance with the subject innovation. In this particular implementation, the MLR component can be positioned to interface to each of the input analyzer component 102, the search engine 104, and the results configuration component 702. To this end, an MLR component can be employed to automate and/or infer an action in accordance with the functionality of each component described herein.

The subject innovation (e.g., in connection with query generation/modification, results selection/configuration, searchable item indexing) can employ various MLR-based schemes for carrying out various aspects thereof. For example, a process for learning and reasoning about predicting which results are desired and how they should be rendered based upon an input in view of context factors can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or other statistical analysis to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of ranking or priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In one more specific example, the MLR component can learn, based on context information (e.g., time of day, week, location, user role) what types of results are desired in view of a determined and/or inferred query as well as how the results should be rendered. For example, if a user routinely queries for specific information and subsequently selects the same or similar set of results from those rendered, over time, the MLR component can learn this pattern of usage. Thus, the system can reason (or predict) that there is a high likelihood that the user will again select the same results upon executing the same or a similar search query. Accordingly, a statistical model can be generated with this information and for the purpose of, upon execution of the query, rendering a specific set of results in a desired manner.

Personalized models can be trained to extract features based on historical data relating to user preferences as well as user feedback on earlier searches. Seed classifiers can be deployed with devices incorporating embodiments described herein, and such classifiers can be tuned during use by consumers. Moreover, certain features of an input can be weighted more heavily than other features. For example, images at the center of a picture can be weighted higher since such images in general have a greater probability of being relevant as compared to tertiary images. Likewise, audio features within the frequency range associated with human speech may be weighted higher than sounds outside of such frequency band. Pixel-mapping techniques can be employed to associate groups of pixels as a function of like color and proximity (e.g., all blue images at the top portion of a picture represent the sky). Any suitable scheme to facilitate extracting features can be employed in accordance with the embodiments described herein.

Figure 13:
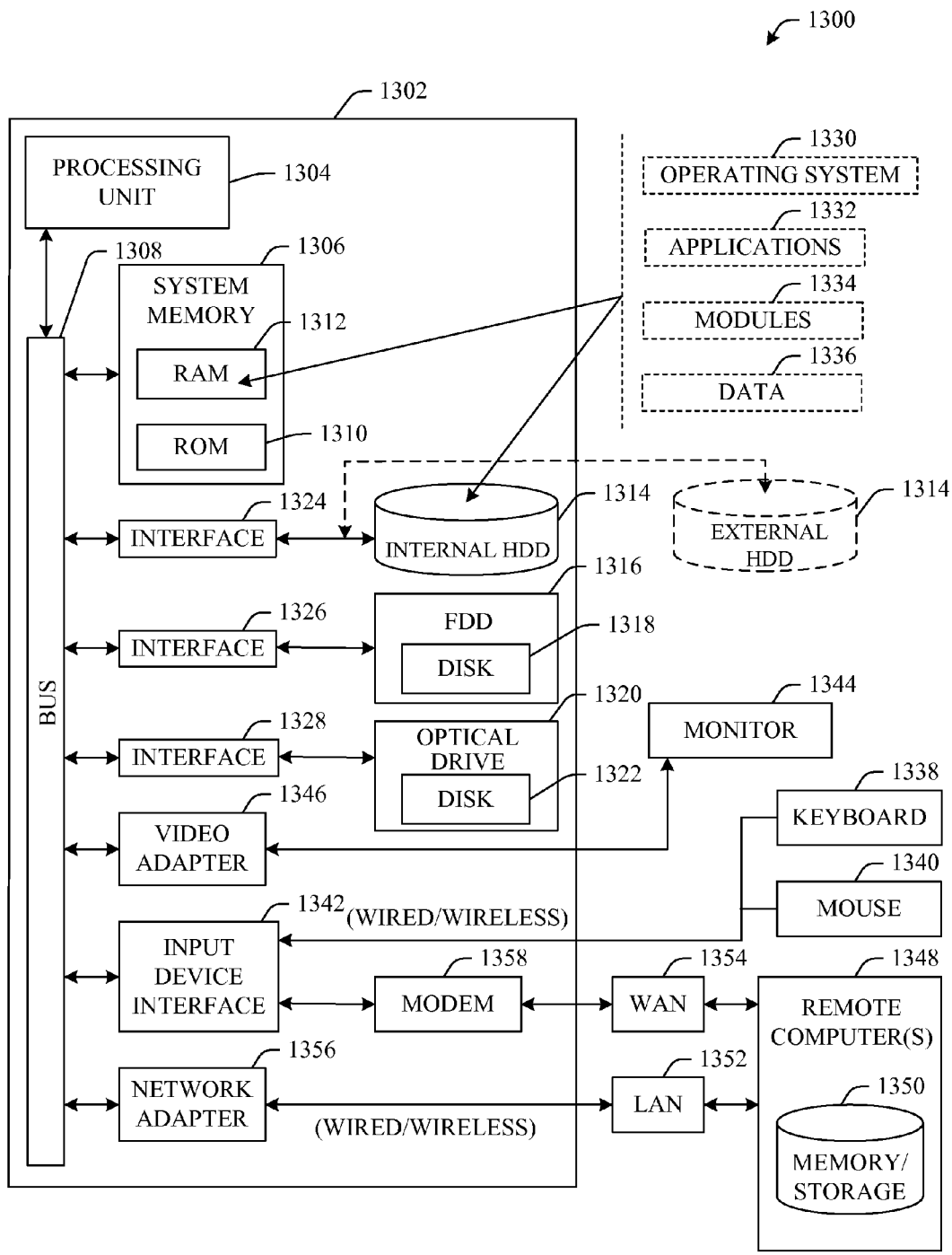
FIG. 13 illustrates a block diagram of a computer operable to execute the disclosed architecture.

Referring now to FIG. 13, there is illustrated a block diagram of a computer operable to execute the disclosed architecture of visual and multi-dimensional search. In order to provide additional context for various aspects of the subject innovation, FIG. 13 and the following discussion are intended to provide a brief, general description of a suitable computing environment 1300 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the innovation includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the innovation can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
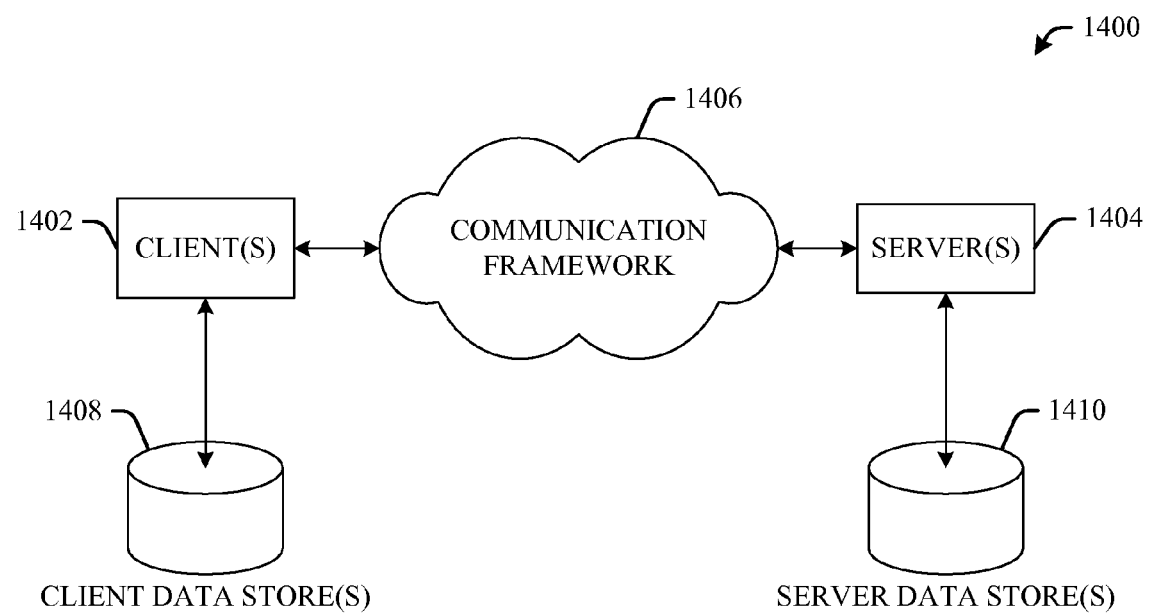
FIG. 14 illustrates a schematic block diagram of an exemplary computing environment in accordance with the subject innovation.

Referring now to FIG. 14, there is illustrated a schematic block diagram of an exemplary computing environment 1400 in accordance with the subject innovation. The system 1400 includes one or more client(s) 1402. The client(s) 1402 can be hardware and/or software (e.g., threads, processes, computing devices). The client(s) 1402 can house cookie(s) and/or associated contextual information by employing the innovation, for example.

The system 1400 also includes one or more server(s) 1404. The server(s) 1404 can also be hardware and/or software (e.g., threads, processes, computing devices). The servers 1404 can house threads to perform transformations by employing the innovation, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer-readable storage medium that facilitates multi-dimension computer search, comprising:
   a processor;
   an input analyzer component executable by the processor to:
      receive an input indicating selection of at least a portion of a picture image;
      identify one or more features, attributes, characteristics, or a combination thereof, of the at least a portion of the picture image;
      generate a search query including text-based keywords and visual criteria based on the one or more features, attributes, characteristics, or a combination thereof, of the at least a portion of the picture image; and
   a search engine comprising:
      a multi-dimension index generator executable by the processor to collect and catalog a plurality of searchable data items as a function of a plurality of index criteria, the plurality of index criteria including at least visual criteria extracted from one or more image data items using at least one of pattern recognition or facial recognition analysis; and a retrieval component executable by the processor to access and retrieve a subset of the plurality of data items in response to the search query based on the text-based keywords and by comparing the visual criteria specified in the search query with the visual criteria extracted from the one or more image data items, the subset of the plurality of data items including one or more web pages, one or more image files, one or more audio files, one or more multi-media files, or a combination thereof.

2. The system of claim 1, the plurality of index criteria further includes at least one of text or audio.

3. The system of claim 1,
wherein the input analyzer component extracts additional search criteria from audio data of the input; and
wherein the search engine identifies a plurality of indexed data items having index criteria matching the additional search criteria.

4. The system of claim 3, the input analyzer component identifies an individual included in the portion of the image data, and the search engine employs the identified individual as search criteria.

5. The system of claim 1, the index generator comprises at least one of a text analyzer, a sound analyzer, or an image analyzer that facilitates identification of the plurality of index criteria.

6. The system of claim 5, the text analyzer includes a language parser that automatically extracts the plurality of index criteria from the plurality of searchable data items.

7. The system of claim 5, the sound analyzer includes a speech recognition component that automatically extracts the plurality of index criteria from the plurality of searchable data items.

8. The system of claim 5, the image analyzer includes a pattern recognition component that automatically extracts the plurality of index criteria from the plurality of searchable data items.

9. The system of claim 1, further comprising a results configuration component that selectively organizes the accessed subset of the plurality of searchable data items as a function of a rendering criterion.

10. The system of claim 9, the results configuration component includes a filter component that sorts the subset of the plurality of searchable data items in accordance with at least one of a user context, a user preference, a relevancy factor with respect to the input, or a device context.

11. The system of claim 9, the results configuration component includes a ranking component that arranges the subset of the plurality of searchable data items based at least in part on a user preference.

12. The system of claim 9, the results configuration component includes an ordering component that determines a display order with respect to a subset of the plurality of searchable data items.

13. A method of indexing multidimensional searchable data items having visual and audio characteristics, the method comprising:
employing a processor executing computer-executable instructions stored on a computer-readable storage medium to implement the following acts:
receiving an image file as an input, the image file including a document having at least one image;
identifying one or more individuals, a context of the one or more individuals, a location of the one or more individuals, one or more landmarks, one or more venues, one or more buildings, or a combination thereof, of the at least one image;
identifying properties of the document;
generating a search query including text-based keywords and visual criteria based on the properties of the document, the one or more individuals, the context of the one or more individuals, the location of the one or more individuals, the one or more landmarks, the one or more venues, the one or more buildings, or a combination thereof, of the at least one image;
analyzing the visual and audio characteristics of the searchable data items, the searchable data items including a plurality of individuals, contexts of the plurality of individuals, locations of the plurality of individuals, a plurality of landmarks, a plurality of venues; a plurality of buildings, or a combination thereof;
identifying one or more patterns within the visual and audio characteristics of the searchable data items;
generating a plurality of index parameters based at least in part upon a subset of the identified one or more patterns;
indexing the searchable data items as a function of the plurality of index parameters; and
providing results to the search query utilizing the plurality of index parameters, the results to the search query including one or more web pages, one or more image files, one or more audio files, one or more multi-media files, or a combination thereof.

14. The method of claim 13, further comprising:
recognizing audio patterns in the searchable data items; and
converting the one or more patterns within the audio characteristics into a subset of the plurality of index parameters.

15. The method of claim 13, further comprising:
executing a search query that includes a visual image as input;
extracting search criteria from the visual image using at least one of pattern recognition or facial recognition; and
returning a particular searchable data item in response to the search query based on relevance to the extracted search criteria.

16. A computer-executable system embodied on a computer-readable storage medium that when executed by a processor facilitates indexing multi-dimensional data items, the system comprising:
means for analyzing a plurality of multi-dimensional data items having visual and audio characteristics;
means for extracting a plurality of features relating to the visual and audio characteristics of the plurality of multi-dimensional data items;
means for converting the extracted plurality of features into a set of index criteria for the plurality of multi-dimensional data items;
means for indexing the plurality of multi-dimensional data items according to the set of index criteria;
means for receiving an input including an audio portion, a picture image portion, a text portion, or a combination thereof;
means for determining whether the input includes at least one of an audio dimension, an image dimension, or a text dimension, the audio dimension including streaming audio and the image dimension including streaming video;

means for parsing the input when the input includes a text portion to identify keywords of the text portion;

means for translating audible speech into text when the input includes an audio portion to establish keywords of the audio portion;

means for identifying one or more subjects, a context, or a combination thereof, of the picture image portion when the input includes the picture image portion;

means for generating a search query based on the plurality of features extracted from the input, wherein the search query includes search criteria and the search criteria include text, one or more images, or a combination thereof; and means for selecting a subset of the indexed data items in response to the search query based in part on a comparison between the search criteria and the set of index criteria, the subset of the indexed data items including one or more web pages, one or more image files, one or more audio files, one or more multi-media files, or a combination thereof.

17. The computer-executable system of claim 16, the means for analyzing the plurality of multi-dimensional data items is an audio analyzer system that extracts a subset of the plurality of features from the audio characteristics of a particular multi-dimensional data item.

18. The computer-executable system of claim 16, the means for analyzing the plurality of multi-dimensional data items is an image analyzer system that extracts a subset of the plurality of features from the visual characteristics of a particular multi-dimensional data item.

19. The computer-executable system of claim 16, further comprising means for searching the plurality of multi-dimensional data items based at least in part upon two dimensions.

20. The method of claim 13, wherein the acts further comprise recognizing trends of graphical data of the at least one image and wherein the visual criteria include the trends of the graphical data.

* * * * *